July 22, 1941.  E. S. PEARCE ET AL  2,250,133
VEHICLE SIGNAL MEANS
Filed Oct. 6, 1937  2 Sheets—Sheet 1

INVENTORS
EDWIN S. PEARCE
BY EDMOND C. KARIBO
Brockett, Hyde, Higley & Mayer
ATTORNEYS

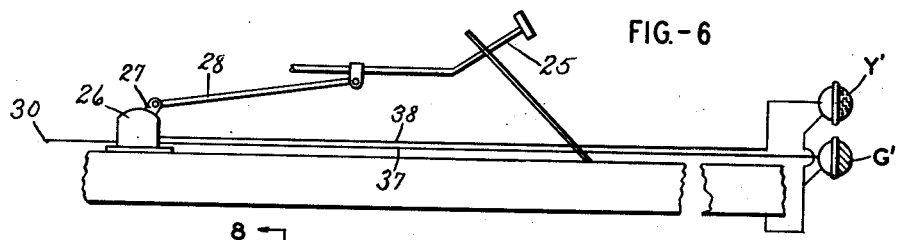
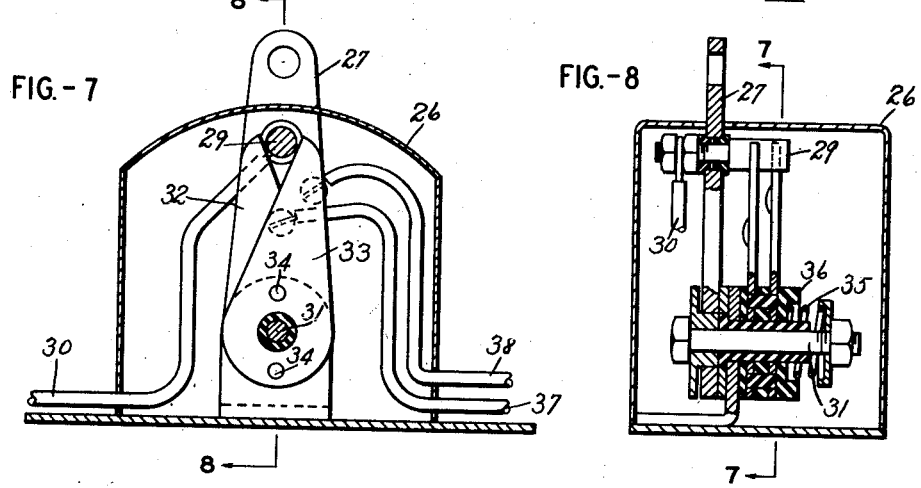
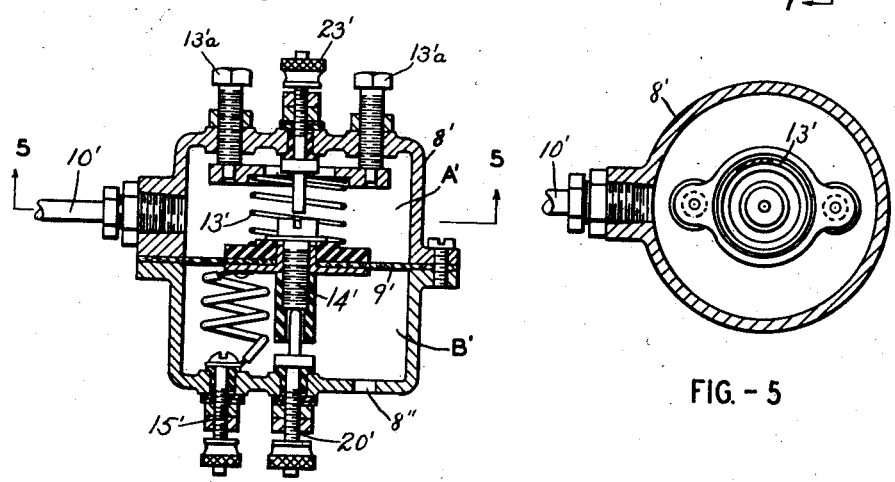

Patented July 22, 1941

2,250,133

UNITED STATES PATENT OFFICE 2,250,133

VEHICLE SIGNAL MEANS

Edwin S. Pearce and Edmond C. Karibo,
Indianapolis, Ind.

Application October 6, 1937, Serial No. 167,545

6 Claims. (Cl. 177—339)

This invention relates to signal means for vehicles and more particularly to signal means carried by an engine-propelled vehicle for automatically signalling to the operator of a similar following vehicle, accelerating and decelerating conditions of the leading vehicle.

Still more particularly the invention embraces, in addition to the usual "stop" signal carried by the usual automotive vehicle, and energized automatically with the braking operation, a "caution" signal and a "clear" signal, selectively energized automatically responsive to operating conditions of the propelling engine.

The objects of the invention are to provide these "caution" and "clear" signals and their automatic operation, by novel means, coincidentally with changes in engine operating conditions so as to be responsive generally to vehicle acceleration and deceleration.

Figure 1:
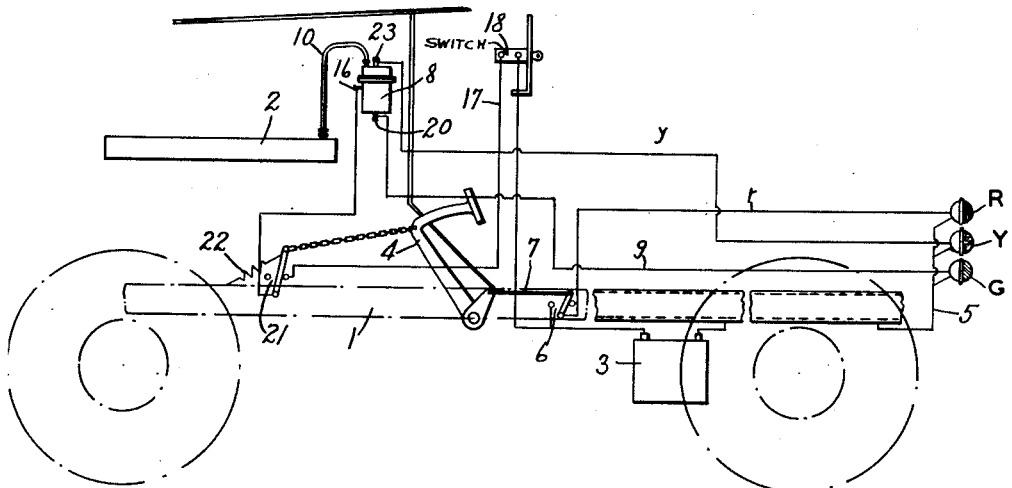
Figures 2, 3:
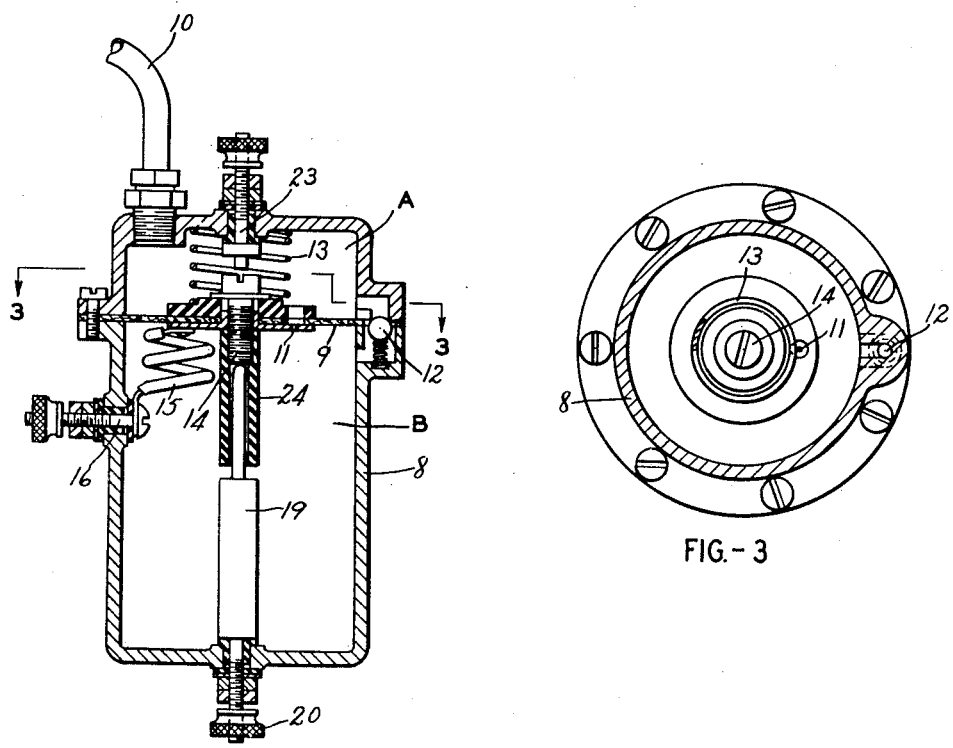

The exact nature of the invention together with further objects and advantages thereof will be apparent from the following description taken in connection with the accompanying drawings, in which Figs. 1, 2 and 3 illustrate an embodiment of the invention, Fig. 1 being a diagrammatic view showing in conventionalized form pertinent parts of an automobile, Fig. 2 being an enlarged view in sectional elevation of parts appearing in Fig. 1 and Fig. 3 being a horizontal section as in the plane of line 3—3, Fig. 2; Figs. 4 and 5 are views corresponding to Figs. 2 and 3 but showing a modification, Fig. 5 being taken as in the plane of line 5—5, Fig. 4; and Figs. 6, 7 and 8 illustrate a third modification, Fig. 6 showing pertinent parts of the vehicle to which the modification is applied, Figs. 7 and 8 being enlarged sectional elevations illustrating in detail parts appearing in Fig. 8, the plane of Fig. 8 being indicated by the line 8—8, Fig. 7 and the plane of Fig. 7 being indicated by the line 7—7, Fig. 8.

With reference now to the modification of Figs. 1, 2 and 3, I indicates the frame of the vehicle, equipped for its propulsion with the usual internal combustion engine, the engine having an inlet manifold 2, the vehicle having a storage battery 3, one side of which is grounded to the frame I, and also being equipped with the usual brakes actuated by a pedal 4.

At its rear end the vehicle is also provided with the usual "stop" signal, here shown as a red light R, one side of which is grounded to the vehicle frame I as by the line 5, the other side of which connects to the battery 3 by a line r and switch 6. The switch 6 is connected to the brake pedal 4 as by link 7 in an arrangement whereby the switch 6 is closed and the signal R consequently energized, only when the pedal 4 is depressed to apply the brakes.

According to the present invention two additional signals are provided at the rear of the vehicle, here shown as a yellow light Y and a green light G. Adjacent the engine a casing 8 is provided, enclosing a movable member such as the diaphragm 9 dividing the hollow of the casing into two chambers A and B. One of these chambers, A, has connection with the inlet manifold 2 of the engine as by a pipe 10.

A small passageway, such as the orifice 11 in the diaphragm 9 is arranged to provide restricted communication between the chambers A and B, the chamber B being closed from the atmosphere. Also preferably a check valve 12 is arranged to permit free flow from the chamber A to the chamber B but prevent flow in the opposite direction. A spring 13 is provided within the chamber A to yieldably urge the diaphragm 9 in the direction to increase the volume of the chamber A and correspondingly decrease the volume of the chamber B.

It will be apparent that the arrangement provides movement of the member 9 responsive to changes in pressure conditions within the engine manifold 2. The engine having driving connection to the wheels of the vehicle, when the engine is operating on an open throttle, and the vehicle consequently travelling at a considerable speed, there will be but slight vacuum within the manifold 2 and correspondingly slight vacuum within the chamber A. The same condition will prevail within the chamber B because of the orifice 11 which serves to gradually equalize the pressure within chambers A and B. The diaphragm 9 will consequently be stationary in the position in which it is yieldably maintained by the spring 13. Supposing the engine throttle be closed or partially closed to decrease the vehicle speed, the vacuum in manifold 2 will be increased and change will be transmitted to the chamber A. This, if change is sufficient to slow vehicle any appreciable amount, will cause the diaphragm 9 to rise against the spring 13 until pressures within chambers A and B are equalized by the orifice 11, the time required for said equalization depending on the relation of orifice diameter to the volume of chamber B and also the amount of vacuum increase in manifold 2. When pressures are approximately equalized in chambers A and B diaphragm will be moved to original position by the spring 13. If, while the diaphragm 9 is lifted, the engine throttle is again opened to accelerate the vehicle, the pressure within the chamber A will rise and diaphragm will return to position shown. The check valve 12 will allow a quick equalization between chambers A and B so that device is almost immediately ready to repeat the above operation.

Means are arranged to provide energization of the signals Y and G responsive to the position of the diaphragm 9. A contactor screw 14 is mounted on the diaphragm with flexible electrical connection 15 to the terminal 16. This terminal 16 has connection with the ungrounded side of the battery 3 as by a line 17 which may include a switch 18 on the instrument board of the vehicle (said switch may be arranged for coincidental operation with the ignition switch of the engine so that the switch 18 is closed only when engine is operating) and switch 21, which is so arranged as indicated, with connection to the brake pedal 4 or other part, that the switch will be closed when the brake pedal is in the "off" position shown, but the switch will be caused to open as by spring 22 when the pedal 4 is depressed to apply the brakes. A contactor 19 having a terminal 20 is arranged within the chamber B to be contacted by the contactor screw 14 under the influence of the spring 13, and this contactor 19 has connection with the ungrounded side of the signal G through line g. The opposite side of the signal G is connected to the ground line 5.

A contactor 23 is arranged in the chamber A to be engaged by the contactor 14 when the diaphragm is raised against the spring 13, and this contactor 23 has connection with the yellow signal Y by a line y.

By the arrangement described, when the parts are in the position shown, the engine operating with open throttle and the vehicle travelling at substantial speed, the spring 13 bearing the contactor 14 against the contactor 19, the green "clear" signal G will be energized. Should the brake be applied, the switch 21 will open to de-energize the contactor screw 14 or both green and yellow signals and the switch 6 will be closed to energize red "stop" signal R.

Should the engine throttle be closed to cause gradual deceleration of the vehicle, the diaphragm 9 will rise against the spring 13, contactor 14 be borne against the contactor 23 and the yellow "caution" signal Y will be energized, the green signal G being just previously de-energized by movement of the contactor 14 from the contactor 19. A tube 24 of insulating material may be provided to maintain alignment between contactors 14 and 19.

Instantly the engine throttle is opened the bypass check valve 12 opens and the energization of the green "clear" signal is re-established.

With reference now to Figs. 4 and 5, a modified form of the casing 8' is provided, which is substituted for the casing 8 shown in Figs. 1, 2 and 3. The casing 8' is divided into chambers A' and B' by a diaphragm 9' generally as before except that the diaphragm 9' is imperforate and the casing has an opening 8" providing communication for the chamber B' with the atmosphere. The chamber A' has connection with the engine manifold as at 10'. The tension of the spring 13' is adjustable as by screws 13'a acting through the yoke indicated. The diaphragm 9' carries a contactor screw as before effective between two contactors, the terminal 20' of the lower of which has connection with the green signal not shown, the upper contactor terminal 23' has connection with the yellow signal as before, and the diaphragm contactor 14' has its terminal 15' connected with the battery as before.

The general operation will follow that of the device described in Figs. 1, 2 and 3 except that energization of both yellow and green signals will instantly follow changes in throttle conditions where, in the device of Fig. 2, slight delay was provided in changing from green to yellow signal.

The device Fig. 4 is not as sensitive as the former. The spring pressure on diaphragm 9' is set at a predetermined constant and only when vacuum is great enough to let atmospheric pressure in chamber B overcome spring, will a yellow signal be given. Further the yellow signal will continue to show as long as sufficient vacuum is produced, whereas in device illustrated by Fig. 2, as soon as pressures in chambers A and B are equalized, the green signal will again be energized, indicating that further reduction in speed is not to be expected.

Figs. 6, 7 and 8 illustrate a modification wherein green and yellow, "clear" and "caution" signals G' and Y' are energized responsive to the accelerator 25 of the vehicle and thus only indirectly to pressure conditions within the manifold of the engine. For the purpose a lost motion switch in a housing 26 is provided, having an actuating lever 27 connected to the accelerator as by a link 28. The lever 27 carries a contactor 29 insulated from it and having connection as by the line 30 to the live side of the battery and the lever is mounted for movement about a bolt 31 responsive to movement of the engine accelerator 25. A pair of contactors 32 and 33 are mounted for movement upon the same axis as the lever 27, insulated from the lever and from each other but secured with each other as by the insulating pins 34. The contactor 29 of the lever 27 extends between the ends of the contactors 32 and 33, the latter being so spaced as to provide a slight lost motion for the contactor 29 therebetween. A spring 35 acting between an insulating friction disk 36 and the end of the bolt 31, yieldably maintains the contactors 32 and 33 against movement. Contactor 32 has connection with the green signal G' as by the line 37 and the contactor 33 has connection with the yellow signal Y' as by line 38.

It will be evident that when the accelerator pedal is depressed it will move the contactor 29 against the contactor 32 of the green "clear" signal G' to energize the latter, whereas release of the accelerator pedal will similarly cause energization of the yellow signal Y'; so that, generally, these signals will indicate changes in speed of the vehicle as before.

What we claim is:

1. In a vehicle having "clear" and "caution" signal means and propelled by an internal combustion engine having manifold inlet means, means arranged for movement responsive to pressure at said manifold, and electric means arranged to be responsive to said pressure-responsive means for energizing the "clear" signal when the pressure in said manifold is steady and for energizing the "caution" signal when the pressure in said manifold is suddenly decreased, said pressure-responsive means including a reciprocable pressure-responsive member, means yieldably urging said member in "clear" signal energizing direction, and check valve means arranged to free said member from pressure opposing its movement in "caution" signal energizing direction.

2. In a vehicle having "clear" and "caution" signal means and propelled by an internal combustion engine having manifold inlet means, means arranged for movement responsive to pressure at said manifold, and electric means arranged to be responsive to said pressure-responsive means for energizing the "clear" signal when the pressure in said manifold is steady and for energizing the "caution" signal when the pressure in said manifold is suddenly decreased, said pressure-responsive means including a reciprocable pressure-responsive member, means yieldably urging said member in "clear" signal energizing direction, and means permitting a restricted flow past said member.

3. In a vehicle having "clear" and "caution" signal means and propelled by an internal combustion engine having manifold inlet means, means providing a pair of chambers separated by a movable member, one of said chambers having connection to said manifold, means yieldably urging said member to enlarge said chamber, means providing restricted communication between said chambers, and electric means arranged to be responsive to movement of said member to energize the "clear" signal when the pressure in said manifold is steady and to energize the "caution" signal when the pressure in said manifold is suddenly decreased.

4. In a vehicle having "clear" and "caution" signal means and propelled by an internal combustion engine having manifold inlet means, means providing a pair of substantially air-tight chambers separated by a movable member, one of said chambers having connection to said manifold, means yieldably urging said member to enlarge said chamber, means providing a bypass between said chambers, check valve means arranged to permit flow in said bypass from said manifold connected chamber to the other chamber only and electric means arranged to be responsive to movement of said member to energize the "clear" signal when the pressure in said manifold is steady and to energize the "caution" signal when the pressure in said manifold is suddenly decreased.

5. In a vehicle having "clear" and "caution" signals and having propelling means including an internal combustion engine controlled by a throttle and having an intake manifold for said engine, a device for controlling said signal means comprising a substantially closed casing, a flexible diaphragm dividing the hollow of said casing into two chambers, there being a small opening through said diaphragm, conduit means providing communication between one of said chambers and said manifold, the other of said chambers being closed, a first electrical contact in said one chamber connected with said "caution" signal, a second electric contact in said other chamber connected with said "clear" signal, a third electric contact carried by flexing of said diaphragm alternatively into engagement with said first or second contact, said third contact being connected with a source of electric power, and means normally holding said third contact in engagement with said second contact.

6. In a vehicle of the class described having a device as in claim 5 including a by-pass connecting said chambers and a check valve in said by-pass permitting fluid flow only from said one chamber to said other chamber.

EDWIN S. PEARCE.
EDMOND C. KARIBO.